(12) United States Patent
Fischer

(10) Patent No.: US 7,695,263 B2
(45) Date of Patent: Apr. 13, 2010

(54) BLOWN FILM DIE FOR PRODUCING TUBULAR FILM

(75) Inventor: Herbert Fischer, Rheine (DE)

(73) Assignee: Windmoeller and Hoelscher KG, Lengerich (DE)

( * ) Notice: Subject to any disclaimer, the term of this patent is extended or adjusted under 35 U.S.C. 154(b) by 1144 days.

(21) Appl. No.: 10/467,170

(22) PCT Filed: Feb. 22, 2002

(86) PCT No.: PCT/EP02/01798

§ 371 (c)(1), (2), (4) Date: Feb. 3, 2004

(87) PCT Pub. No.: WO02/070230

PCT Pub. Date: Sep. 12, 2002

(65) Prior Publication Data

US 2004/0113330 A1    Jun. 17, 2004

(30) Foreign Application Priority Data

Mar. 5, 2001   (DE) ............................... 101 10 479
May 11, 2001   (DE) ............................... 101 22 856

(51) Int. Cl.
*B29C 47/92* (2006.01)
(52) U.S. Cl. .................. 425/72.1; 425/141; 425/144; 425/326.1; 425/387.1; 425/392
(58) Field of Classification Search ............... 425/72.1, 425/141, 144, 387.1, 392, 326.1, 143
See application file for complete search history.

(56) References Cited

U.S. PATENT DOCUMENTS

| | | | | |
|---|---|---|---|---|
| 3,835,209 A | * | 9/1974 | Karabedian | 264/51 |
| 4,019,843 A | * | 4/1977 | Zimmermann | 425/72.1 |
| 4,209,475 A | * | 6/1980 | Herrington et al. | 264/40.1 |
| 4,330,501 A | * | 5/1982 | Jones et al. | 264/566 |
| 4,425,290 A | * | 1/1984 | Upmeier | 264/40.1 |
| 4,443,400 A | * | 4/1984 | Herrington | 264/519 |
| 4,464,318 A | * | 8/1984 | Upmeier et al. | 264/40.1 |
| 4,606,879 A | * | 8/1986 | Cerisano | 264/565 |

(Continued)

FOREIGN PATENT DOCUMENTS

CA         2028575      5/1991

(Continued)

*Primary Examiner*—Eric Hug
*Assistant Examiner*—Seyed Masoud Malekzadeh
(74) *Attorney, Agent, or Firm*—Jacobson Holman PLLC

(57) ABSTRACT

A film die for the production of tubular film made of thermoplastic synthetics has at least one feed channel for the synthetic fused material which ends in a ring-shaped discharge nozzle with an interior and/or exterior cooling ring that is adjusted to the diameter of the extruded synthetic tube, in which physical parameters of the air blown onto the extruded film tube can be variably changed sector by sector. The film die is divided into sections, in which the temperature is individually variable, and/or additional bores are arranged across the circumference of the film die, which are essentially aligned vertical to the exterior cooling ring, whereby air of variable temperatures can be blown from them, the physical parameters of which are variable. The film die has at least one control unit that controls or operates the various measures for influencing the film thickness.

15 Claims, 2 Drawing Sheets

U.S. PATENT DOCUMENTS

| | | | | |
|---|---|---|---|---|
| 4,750,874 A | * | 6/1988 | Keim | 425/72.1 |
| 4,826,414 A | * | 5/1989 | Planeta | 425/72.1 |
| 4,834,924 A | * | 5/1989 | D'Annunzio et al. | 264/40.3 |
| 4,929,162 A | * | 5/1990 | Planeta | 425/72.1 |
| 5,178,806 A | * | 1/1993 | Predohl | 264/40.1 |
| 5,281,375 A | | 1/1994 | Konermann | 264/40.3 |
| 5,288,219 A | * | 2/1994 | Smith | 425/72.1 |
| 5,318,427 A | * | 6/1994 | Voss | 425/72.1 |
| 5,354,190 A | * | 10/1994 | Hofer et al. | 425/72.1 |
| 5,468,134 A | * | 11/1995 | Cree | 425/72.1 |
| 5,562,926 A | * | 10/1996 | Karl | 425/72.1 |
| 5,576,029 A | * | 11/1996 | Planeta | 425/72.1 |
| 5,580,582 A | | 12/1996 | Achelpohl | 425/72.1 |
| 5,624,689 A | * | 4/1997 | Schmitz et al. | 425/72.1 |
| 5,676,893 A | * | 10/1997 | Cree | 264/40.1 |
| 5,804,221 A | * | 9/1998 | Planeta et al. | 425/72.1 |
| 6,739,855 B2 | * | 5/2004 | Randolph et al. | 425/72.1 |
| 6,783,344 B1 | * | 8/2004 | Rudolf | 425/72.1 |

FOREIGN PATENT DOCUMENTS

| | | | |
|---|---|---|---|
| DE | 26 58 518 | * | 6/1978 |
| DE | 39 20 194 | | 1/1991 |
| DE | 42 07 439 | * | 6/1993 |
| EP | 0 425 797 | * | 5/1991 |

* cited by examiner

BLOWN FILM DIE FOR PRODUCING TUBULAR FILM

CROSS-REFERENCE TO RELATED APPLICATION

This is a nationalization of PCT/EP02/01798 filed Feb. 22, 2002 and published in German.

BACKGROUND OF THE INVENTION

1. Field of Invention

The invention relates to a film die for the production of tubular film made of thermoplastic synthetics. The film die has at least one feed channel for synthetic fused material which ends in a ring-shaped discharge nozzle with an interior and/or exterior cooling ring that is adjusted to the diameter of the extruded synthetic tube.

2. Description of the Prior Art

Film dies of this type are known in various embodiments, whereby the interior cooling air supplied to and discharged through the film die in axial direction serves for the cooling of the extruded film tube and for the inflation of the film tube into a tubular film bubble, which stretches the fusible synthetic tube. However, film dies exist, in which no air is supplied and/or discharged in the film bubble during the extrusion process, but instead a predetermined static air volume is present in the film bubble.

Generally, exterior cooling rings have a ring-shaped nozzle gap that is directed toward the extruded film tube, through which cool air is blown so that the same is rapidly cooled down in order to improve the output with a so-called frost pipe that is as low as possible.

In order to control the thickness of the film tube blown into a tubular film bubble across its circumference, it is known to variably heat and/or cool the tube-shaped extruded synthetic fused material section by section in order to influence the thickness profile. For this purpose the effect is being utilized that while inflating the synthetic tube into a tubular bubble, the warmer areas are stretch formed at a stronger degree, and the cooler areas at a lesser degree. For this purpose, physical parameters of the cool air are varied sector by sector. These parameters include the temperature and the volume flow of the cool air.

It is known from DE 42 07 439 that the exterior cooling ring is divided into sectors, in which the air blown onto the extruded film tube can be heated and/or cooled. This film die has a compact construction, because the elements for the variable heating or cooling of the air blown onto the extruded film tube are directly integrated into the exterior cooling ring. Heating cartridges distributed across the circumference may be arranged on it for the heating, and Peltier elements distributed across the circumference may be arranged on it for the cooling. The variation of the physical parameters of the cool air sector by sector can also occur on or through the interior cooling ring in addition, or as an alternative.

On the other hand, film dies have been known from DE 42 36 443 A, in which heating cartridges distributed across the circumference are integrated into the film die itself, whereby these heating cartridges each can be activated in order to control the thickness of the film tube. A convertibility of the temperature of the die section by section results from this construction. However, this system has the advantage of a more lethargic control as opposed to the system with the exterior cooling ring.

Even though the film die known from DE 42 07 439 A enables a quicker and more exact control of the cool air escaping from the film die and blown onto the film tube, inaccuracies with the control of the wall thickness of the blown film tube still exist, in that interactions between the air of variable temperatures flowing from the exterior cooling ring and the ambient air occur within the area of the nozzle discharge of the exterior cooling ring. Depending on changes in ambient conditions, as the case may be, unsteady turbulences are created here, which influence the cooling results in the area of the film tube in an unpredictable manner.

SUMMARY OF THE INVENTION

It is therefore the task of the invention to embody a film die according to the generic term in such a way that the control of the wall thickness of the blown film tube can be reliably performed.

According to the invention, this task is solved based on a film die having the features described herein.

In most cases the film die for the production of tubular film made of thermoplastic synthetics has at least one feed channel for the synthetic fused material, which ends in a ring-shaped discharge nozzle, and additionally has pipes for the feeding and discharge of interior cooling air, and an exterior ring framing the extruded synthetic tube that is divided into sectors, in which the air blown onto the extruded film tube can variably be heated and/or cooled. However, it is also possible to provide no pipes at all for the supply and discharge of interior cooling air so that the film bubble remains without any air supply in a so-called static condition.

According to the invention, the temperature of the film die is variable section by section. Usually, this convertibility is created by means of heating cartridges inside of the film die, which additionally are distributed across its circumference.

By means of these heating cartridges the temperature of the film die can be changed section by section, whereby each section is comprised of an angular range in the direction of circumference of the die.

The convertibility of the die temperature section by section, however, can also be achieved by leading air pipes through the die. These air pipes can be constructed in such a way that the air discharge and supply pipes end at the circumference of the die so that the film die itself is not influenced by these airstreams. If such pipes are used, the change of the die temperature occurs due to the fact that the physical parameters in the air, which flows through these pipes, are changed. These parameters include especially the temperature and the volume of the air per time unit. As a general rule, an air pipe will be provided per section in order to be able to vary the temperature of the die section by section. Of course, other possibilities of influencing the die temperature are also conceivable. It is important for the purposes of this invention, however, that this change can occur section by section.

Furthermore it is not necessary to limit the influence of the said measures of the temperature influencing on the area of the die, which is located in radial direction outside of the film tube, or of the nozzle ring, respectively. The change of the die temperature performed section by section can also be performed in sectors within the nozzle ring, or by sectors inside and outside of the nozzle ring.

As an addition, or as an alternative, additional bores may be arranged across the circumference in the film die, which are essentially aligned vertical to the exterior cooling ring, whereby air of variable temperatures can be blown from them. According to the invention, a first control unit can be provided for the heating cartridges and/or cooling elements in the exterior cooling ring, and a second control unit for the heating cartridges, or for the control of the volume flow, or for the temperature of the air flowing from the additional bores in the film die.

According to an advantageous embodiment of the invention, heating cartridges and/or cooling elements are arranged in the exterior cooling ring across the circumference.

The control units can be activated depending on the signal of a thickness measurement device for the wall thickness of the film bubble.

Preferably, a dependent control is performed in such a way that initially the heating cartridges and/or cooling elements of the exterior cooling ring, and the more lethargic heating cartridges next in line are activated within the film die.

Surprisingly, it has been shown that the overlap of the cooling of the film bubble across the exterior ring by means of the more lethargic heating cartridges admitted into the film die itself enables a more exact control of the wall thickness of the film bubble.

BRIEF DESCRIPTION OF THE DRAWINGS

Additional details and advantages of the invention are explained in more detail in the embodiment examples illustrated in the drawing. The figures show.

DETAILED DESCRIPTION OF THE PREFERRED EMBODIMENTS

Figure 1:
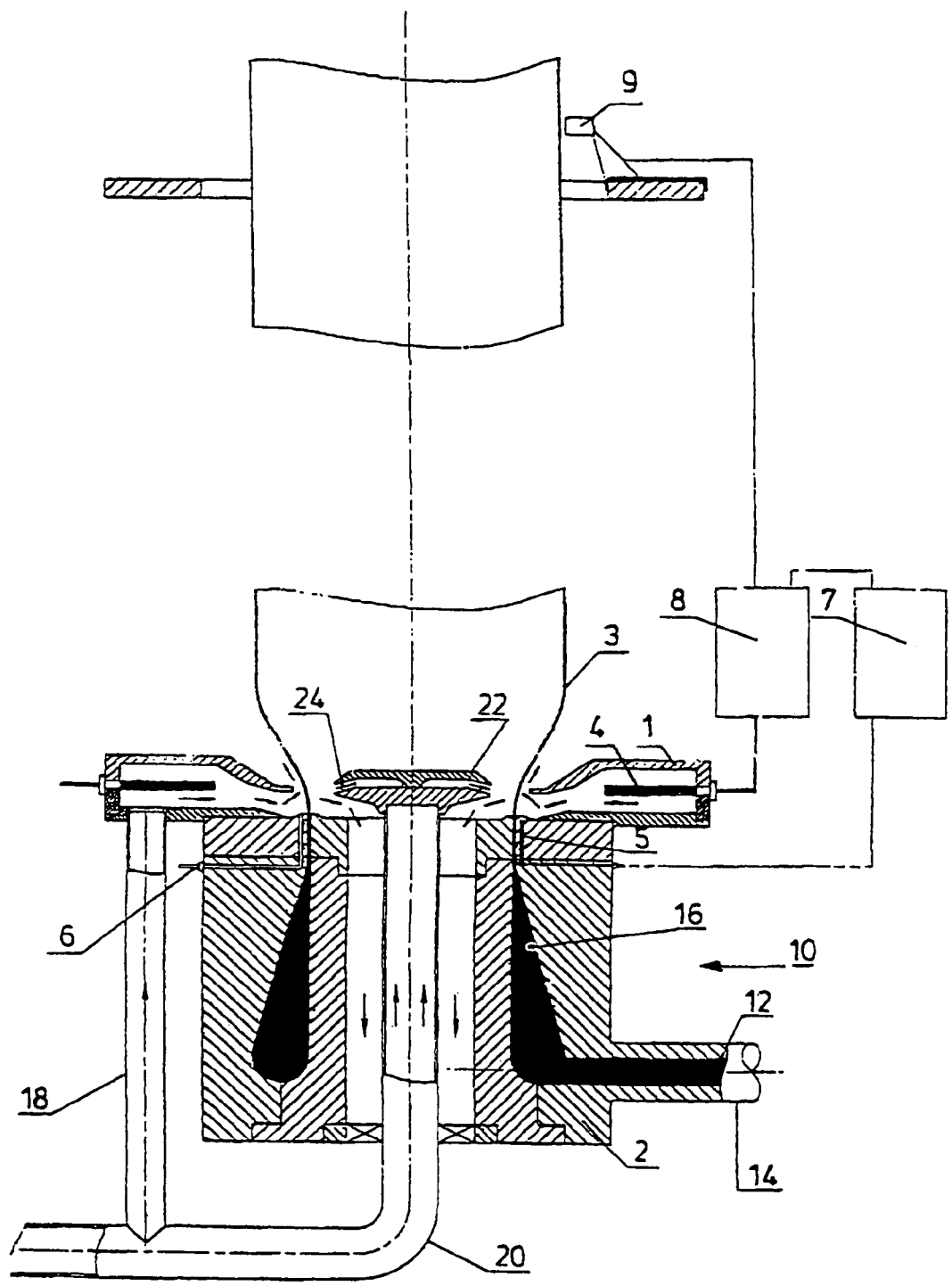
FIG. 1: An embodiment example of an inventive film die, which is illustrated at a vertical section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The synthetic fused material 12 is fed to the film die 10 from the schematically arranged extruder via an adapter fitting 14. The synthetic fused material is then directed to a ring manifold channel 16 for its distribution, which then ends into the ring-shaped discharge nozzle. The partially sectional film tube 3 is discharged from the ring-shaped nozzle gap, which is embodied of two die rings. A cooling ring 1 is located on the exterior die ring, which directs cooling air onto the extruded tubular film 3 directly above the die ring.

The cooling air being fed is mutually delivered by means of a not illustrated blower for interior and exterior cooling, and fed to a connecting pipe 18 to the exterior cooling ring 1, or via a pipe 20 to the interior cooling ring 22, the discharge gap 24 of which is preferably tilted toward the bottom, or is simply arranged to blow radial toward the exterior so that the sharply bundled air jet hits the interior side of the film tube at about the same height as that of the exterior air jet. The general construction of the film die as seen in the figure is known from DE 1 96 09 62 A, or from DE 42 07 439 A, to which reference is made for purposes of simplifying any additional description.

Heating rods that are evenly distributed across the circumference are arranged in the exterior cooling ring 1 of the film die according to the invention, which protrude radial from the exterior to the interior. As is obvious in the figure, the heating rods 4 are arranged in the ring-shaped exterior wall of the exterior cooling ring 1. The heating rods 4 are equipped with heating cartridges, which can be activated independently of one another.

Heating cartridges 5 evenly distributed across the circumference, which can be activated independently of one another, are arranged in the film die 10 next to the exterior cooling ring 1 with the heating rods 4 in the area of the ring-shaped discharge nozzle.

In the upper area of the film tube bubble, i.e., in the area after the frost pipe, a thickness measurement unit 9 is arranged for the measurement of the thickness of the film tube. The corresponding measurement readings are fed to a data processing and control unit 8 for the heating rods 4 in the exterior cooling ring. The readings are then transmitted from this data processing and control unit 8 to a data processing and control unit 7 for the heating cartridges 5 in the film die.

The embodiment illustrated additionally provides air pipes 6 in the film die, which are aligned essentially vertical to the exterior cooling ring, as illustrated in the figure. The air pipes 6 distributed across the circumference are also integrated in the film die 10. Variably heated or cooled air, which hits the cooling air stream in the manner illustrated, which is discharged from the nozzle gap of the exterior cooling ring 1, can then be fed through the air pipes 6 in a controlled manner. Here it is also possible, for example, to vary the volume flow of the air, which is fed through the air pipes 6.

Figure 2:
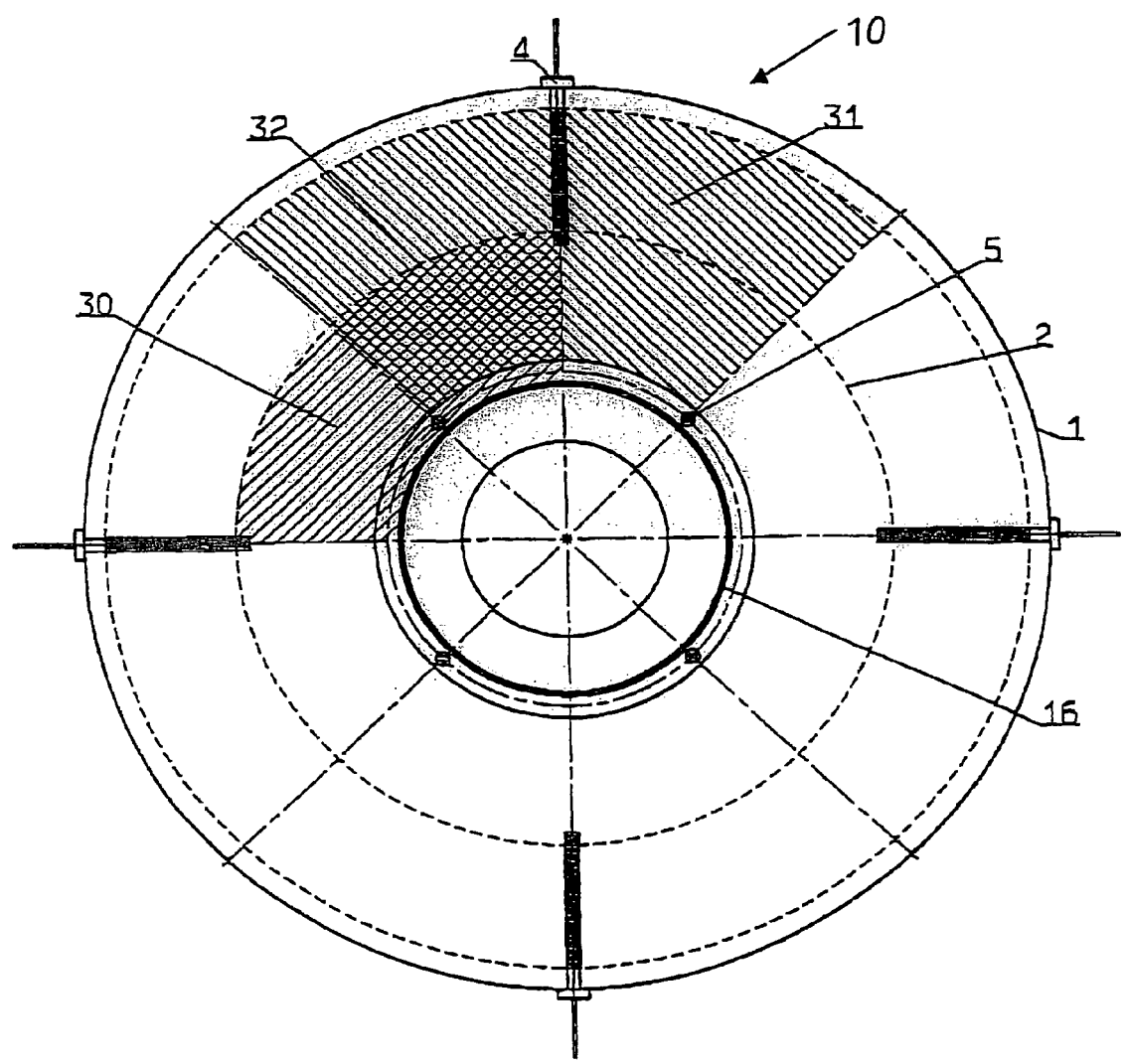
FIG. 2: A drawing of the position of the sectors of an exterior cooling ring, and of the position of the heating cartridges, which are arranged on the circumference of a die.

FIG. 2 shows a drawing of the position of the heating cartridges 5 of the exterior of the cooling ring 1, and of the die 10 in an embodiment example of the invention. Sections 30 are assigned to the heating cartridges 5, within which a variation of the temperature of the heating cartridge 5 significantly influences the temperature and therefore the viscosity of the fused material. One of these sections 30 is illustrated as a hatching, which extends laterally at a 45° angle from the bottom left to the top right. Analogous to the sections 30, sectors 31 are shown, within which the extruded film tube is influenced primarily by the heating effect of the assigned heating rod 4. One of these sectors 31 is highlighted by a hatching, which extends at a 45° angle from the top left to the bottom right. In dies according to the invention, resulting sectors 32 are created from the sectors 31, and from the sections 30 of the die 10. In the shown embodiment example, the die 10 is arranged to the exterior cooling ring 1 in a circumferential direction in such a way that the resulting sectors 32 overlap a smaller angle than each of the sectors 30 and sectors 31 individually.

A resulting sector 32 is highlighted in FIG. 2 by means of the overlapping of both above mentioned hatchings.

Such an arrangement enables a higher resolution with the control of the film's viscosity.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| Reference List | |
|---|---|
| 1 | Cooling ring |
| 2 | |
| 3 | Film tube |
| 4 | Heating rods |
| 5 | Heating cartridges |
| 6 | Air pipes |
| 7 | |

-continued

| Reference List | |
|---|---|
| 8 | Control unit |
| 9 | Thickness measurement device |
| 10 | Film die |
| 11 | |
| 12 | Synthetic fused material |
| 13 | |
| 14 | Adapter fitting |
| 15 | |
| 16 | Ring manifold channel |
| 17 | |
| 18 | Connecting pipe |
| 19 | |
| 20 | Pipe |
| 21 | |
| 22 | Interior cooling ring |
| 23 | |
| 24 | |
| 25 | |
| 30 | Sections of the die |
| 31 | Sectors of the cooling rings |
| 32 | Resulting sectors |

What is claimed is:

1. A film die for the production of tubular film made of thermoplastic synthetics, the film die comprising at least one synthetic fused material feed channel which terminates in a ring-shaped discharge nozzle, at least one of an interior and an exterior cooling ring configured for a diameter of the tubular film, the tubular film being divided along a length thereof into sectors in which physical parameters of air blown onto the tubular film can be variably changed sector by sector such that in a portion of the film die associated with at least one of the sectors in which temperature is individually variable, the film die includes (i) heating cartridges therein and (ii) conduits arranged across a circumference in the film die from which the air is discharged, the air conduits being essentially aligned vertical to the exterior cooling ring, and at least one control unit that controls the physical parameters in order to influence a thickness of the film, the sectors in which the temperature is variable and the sectors in which the physical parameters of the air which is blown from at least one of the interior and the exterior cooling ring onto the tubular film are variable being arranged in a circumferential direction of the tubular film in relation to each other such that the film die has ranges of the sectors which overlap one another with an overlap angle that is smaller in the circumferential direction of the tubular film than is a sector angle of an individual sector.

2. The film die according to claim 1, wherein at least one of the heating cartridges and the air conduits is arranged in the exterior cooling ring across a circumference of the exterior cooling ring.

3. The film die according to claim 1, wherein the control unit is activated based on receipt of a signal from a thickness measurement device that determines a wall thickness of the tubular film.

4. The film die according to claim 3, wherein the film die is configured to control the tubular film wall thickness by influencing at least one of the physical parameters of the air of the cooling ring and the temperature of the sectors.

5. The film die according to claim 4, wherein the physical parameter is the temperature of the air that is blown from at least one of the interior and the exterior cooling ring onto the tubular film.

6. The film die according to claim 4, wherein the physical parameter is the volume of the air that is blown per time unit from at least one of the interior and the exterior cooling ring onto the tubular film.

7. The film die according to claim 1, wherein the exterior cooling ring and the interior cooling ring are divided into the sectors within which the physical parameters of the air that is blown from at least one of the interior and the exterior cooling ring onto the tubular film are varied sector by sector, with the sectors of the interior ring being arranged in relation to the sectors of the exterior ring in the circumferential direction of the tubular film such that the ranges of the sectors of both rings overlap, with the overlap angle being smaller in the circumferential direction of the tubular film than is the sector angle of both rings individually.

8. A film die for the production of extruded tubular film made of thermoplastic synthetics, the film die comprising at least one feed channel for synthetic fused material which ends in a ring-shaped discharge nozzle, and at least one of an interior and an exterior cooling ring adjusted to a diameter of the extruded synthetic tubular film and divided into sectors in which physical parameters of air blown onto the extruded film can be variably changed sector by sector with at least one of (i) a temperature of the die being individually variable by heating cartridges which are provided within the film die and which are distributed across a circumference thereof and (ii) the temperature of the die being individually variable by leading air pipes through the die of which parts are essentially aligned vertical to the exterior cooling ring such that air flows through the leading air pipes and is blown from the pipes onto the film, and at least one control unit that controls variables for influencing a thickness of the film, the sectors in which the temperature is variable and the sectors in which the physical parameters of the air which is blown from at least one of the interior and the exterior cooling ring onto the tubular film are variable being arranged in a circumferential direction of the tubular film in relation to each other such that the film die has ranges of the sectors which overlap one another with an overlap angle that is smaller in the circumferential direction of the tubular film than is a sector angle of an individual sector such that the viscosity of the tubular film is influenced by both the temperature-variable sector and the air parameter-variable sector.

9. The film die according to claim 8, further comprising a film thickness measurement unit, and wherein the control unit is configured to effect control based on a signal received from the film thickness measurement unit.

10. A film die for the production of extruded tubular film made of thermoplastic synthetics, the film die comprising at least one feed channel for synthetic fused material which ends in a ring-shaped discharge nozzle, at least one of an interior and an exterior cooling ring adjusted to a diameter of the extruded synthetic tubular film and divided into sectors in which physical parameters of air blown onto the extruded film can be variably changed sector by sector, with a temperature of the film die being individually variable by at least one of (i) heating cartridges which are provided within the film die and which are distributed across a circumference thereof and (ii) leading air pipes through the die of which parts are essentially aligned vertical to the exterior cooling ring such that air flows through the leading air pipes and is blown from the pipes onto the film, a first control unit that controls at least one of the heating and the cooling of the air that is blown from the exterior cooling ring onto the film tube, and a second control unit that controls at least one of a temperature of the air blown from the air pipes, a volume of the air blown from the air pipes, and operation of the heating cartridges in the film die, the sectors in which the temperature is variable and the sectors in which the physical parameters of the air which is blown from at least one of the interior and the exterior cooling ring onto the tubular film are variable being arranged in a circumferential direction of the tubular film in relation to each other such that the film die has ranges of the sectors which overlap one another with an overlap angle that is smaller in the circumferential direction of the tubular film than is a sector angle of an individual sector such that the viscosity of the tubular film is influenced by both the temperature-variable sector and the air parameter-variable sector.

11. The film die according to claim 10, further comprising a film thickness measurement unit, and wherein the first and the second control units are configured to control variables that influence a thickness of the film based on a signal received from the film thickness measurement unit.

12. The film die according to claim 11, wherein the signal from the film thickness measurement unit is first transmitted to the first control unit and then transmitted to the second control unit.

13. A film die for producing extruded thermoplastic synthetic tubular film, the film die comprising:

at least one feed channel for synthetic fused material, the feed channel terminating in a ring-shaped discharge nozzle;

at least one of an interior and an exterior cooling ring divided into sectors such that physical parameters of air discharged onto the extruded film are controllably variable within each of the sectors, with a temperature of the film die being individually varied by at least one of (i) heating cartridges in the film die and distributed across a circumference thereof and (ii) air conduits in the film die, at least a portion of the air conduits being aligned substantially vertical to the exterior cooling ring such that air flows through the air conduits and is discharged therefrom onto the film;

a first control unit that controls at least one of the heating and the cooling of the air that is discharged from the exterior cooling ring onto the film tube;

a second control unit that controls at least one of a temperature of the air discharged from the air conduits in the film die, a volumetric flow of the air discharged from the air conduits in the film die, and a temperature of the heating cartridges in the film die; and a film thickness measurement unit located downstream of the film die that determines a thickness of the extruded film, the first and the second control units being configured to operate based on a signal received from the film thickness measurement unit, the sectors in which the temperature is variable and the sectors in which the physical parameters of the air which is blown from at least one of the interior and the exterior cooling ring onto the tubular film are variable being arranged in a circumferential direction of the tubular film in relation to each other such that the film die has ranges of the sectors which overlap one another with an overlap angle that is smaller in the circumferential direction of the tubular film than is a sector angle of an individual sector such that the viscosity of the tubular film is influenced by both the temperature-variable sector and the air parameter-variable sector.

14. The film die according to claim 13, wherein the signal from the film thickness measurement unit is first transmitted to the first control unit and then transmitted to the second control unit, the signal to the first control unit being used to control a temperature of a heating rod located in the exterior cooling ring.

15. The film die according to claim 1, wherein the sectors in which the temperature is variable and the sectors in which the physical parameters of the air which is blown from at least one of the interior and the exterior cooling ring onto the tubular film are variable are oriented in a plane that is perpendicular to a longitudinal axis of the film die and the tubular film.

* * * * *